(12) United States Patent
Kim et al.

(10) Patent No.: US 9,852,445 B2
(45) Date of Patent: Dec. 26, 2017

(54) MEDIA CONTENT PROVISION

(71) Applicant: Empire Technology Development LLC, Wilmington, DE (US)

(72) Inventors: Seungil Kim, Seoul (KR); Youngil Ko, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 478 days.

(21) Appl. No.: 14/295,936

(22) Filed: Jun. 4, 2014

(65) Prior Publication Data

US 2015/0356604 A1    Dec. 10, 2015

(51) Int. Cl.
*G06Q 30/00* (2012.01)
*G06Q 30/02* (2012.01)

(52) U.S. Cl.
CPC .............................. *G06Q 30/0261* (2013.01)

(58) Field of Classification Search
None
See application file for complete search history.

(56) References Cited

U.S. PATENT DOCUMENTS

| | | |
|---|---|---|
| 6,446,261 B1 | 9/2002 | Rosser |
| 7,146,627 B1 | 12/2006 | Ismail et al. |
| 7,996,862 B2 | 8/2011 | Babu |
| 8,522,271 B2 | 8/2013 | Childress et al. |
| 8,887,186 B2 | 11/2014 | Oh et al. |
| 2002/0019769 A1 | 2/2002 | Barritz et al. |
| 2002/0087978 A1 | 7/2002 | Nicholson et al. |
| 2002/0129368 A1 | 9/2002 | Schlack et al. |
| 2003/0126013 A1* | 7/2003 | Shand .................. G06Q 30/02 705/14.52 |
| 2004/0044677 A1* | 3/2004 | Huper-Graff .......... G06Q 30/02 |
| 2004/0139204 A1* | 7/2004 | Ergezinger ......... G06Q 30/0601 709/229 |
| 2006/0245571 A1* | 11/2006 | Radziewicz ...... H04M 3/42017 379/220.01 |
| 2007/0269787 A1* | 11/2007 | Cronstrom ........ G06F 17/30899 434/350 |
| 2009/0192874 A1 | 7/2009 | Powles et al. |

(Continued)

FOREIGN PATENT DOCUMENTS

| | | |
|---|---|---|
| KR | 1020100110391 A | 10/2010 |
| KR | 1020140023788 A | 2/2014 |

OTHER PUBLICATIONS

"Viewing recommendation based upon identification of Viewers," An IP.com Prior Art Database Technical Disclosure, p. 1, (Apr. 13, 2009).

(Continued)

*Primary Examiner* — Matthew T Sittner
(74) *Attorney, Agent, or Firm* — Brundidge & Stanger, P.C.

(57) ABSTRACT

Technologies are generally described for a media content provision scheme. In some examples, a method to provide audience-centric content may include identifying a targeted user from among one or more users proximate to an electronic device based, at least in part, on information regarding previous media selections by each of the one or more users; and providing the one or more users with media content directed to the targeted user.

10 Claims, 9 Drawing Sheets

(56) References Cited

U.S. PATENT DOCUMENTS

| | | | |
|---|---|---|---|
| 2009/0222345 A1* | 9/2009 | Greene | G06Q 30/02 705/14.51 |
| 2009/0300675 A1 | 12/2009 | Shkedi | |
| 2009/0319365 A1* | 12/2009 | Waggoner | G06F 17/30029 705/14.41 |
| 2011/0093337 A1* | 4/2011 | Granit | G06Q 30/0251 705/14.53 |
| 2011/0093474 A1* | 4/2011 | Etchegoyen | G06Q 30/02 707/748 |
| 2011/0169860 A1* | 7/2011 | Ito | G06Q 30/02 345/629 |
| 2011/0257985 A1* | 10/2011 | Goldstein | G06F 17/30256 705/1.1 |
| 2012/0078725 A1* | 3/2012 | Maitra | G06Q 30/0269 705/14.66 |
| 2013/0024276 A1* | 1/2013 | Kamat | G06Q 30/0241 705/14.46 |
| 2013/0077835 A1* | 3/2013 | Kritt | G06K 9/00677 382/118 |
| 2013/0179201 A1* | 7/2013 | Fuerstenberg | G06Q 30/0255 705/5 |
| 2014/0164129 A1* | 6/2014 | Joshi | G06Q 30/0261 705/14.58 |
| 2014/0222588 A1* | 8/2014 | Ozaki | G06Q 30/02 705/14.71 |
| 2014/0249886 A1* | 9/2014 | Levinsohn | G06Q 30/0242 705/7.29 |
| 2015/0039451 A1* | 2/2015 | Bonfiglio | G06K 9/00892 705/15 |
| 2015/0106442 A1* | 4/2015 | Baldachin | G06F 17/30899 709/203 |
| 2015/0356604 A1* | 12/2015 | Kim | G06Q 30/0261 705/14.58 |

OTHER PUBLICATIONS

"System and method to recommend personalized TV channels for multiple people," IP.com Prior Art Database Disclosure, pp. 2 (Jul. 27, 2012).

* cited by examiner

*FIG. 3*

|  | A | B | C | D |
|---|---|---|---|---|
| USER 132 | 150 | 40 | 30 | 5 |
| USER 134 | 30 | 20 | 40 | 20 |
| USER 136 | 80 | 10 | 45 | 10 |
| ⋮ | ⋮ | ⋮ | ⋮ | ⋮ |
| AVERAGE | 80 | 20 | 40 | 15 |

FIG. 4

|  | Index of A | Index of B | Index of C | Index of D | Total Index |
|---|---|---|---|---|---|
| USER 132 | 1.875 | 2.000 | 0.750 | 0.333 | 4.958 |
| USER 134 | 0.375 | 1.000 | 1.000 | 1.333 | 3.708 |
| USER 136 | 1.000 | 0.500 | 1.125 | 0.667 | 3.292 |
| ⋮ | ⋮ | ⋮ | ⋮ | ⋮ | ⋮ |

MEDIA CONTENT PROVISION

BACKGROUND

Online advertising uses the Internet to deliver promotional marketing messages to consumers. Also known as Internet advertising, it includes email marketing, search engine marketing, social media marketing, various types of display advertising, and mobile device advertising. Like other advertising media, online advertising frequently involves both a publisher, who integrates advertisements into its online content, and an advertiser, who provides the advertisements to be displayed on the publisher's content.

SUMMARY

In an example, a method to provide audience-centric content may include identifying a targeted user from among one or more users proximate to an electronic device based, at least in part, on information regarding previous media selections by each of the one or more users; and providing the one or more users with media content directed to the targeted user.

In another example, a content-providing server system may include a transmitter unit configured to transmit media content to a display device; a receiver unit configured to receive data regarding behavior of each of one or more users in response to the media content; an information generator unit configured to generate information regarding previous media selections by each of the one or more users based, at least in part, on the data regarding the behavior of each of the one or more users; and a storage unit configured to store the information regarding previous media selections by each of the one or more users.

In yet another example, an electronic device may include a camera configured to capture an image of one or more users proximate to the display device; a targeted user identification unit configured to identify a targeted user from among the one or more users based, at least in part, on information regarding previous media selections by each of the one or more users; and a display configured to display media content directed to the targeted user.

In yet another example, a computer-readable storage medium may store thereon computer-executable instructions that, in response to execution, cause a content-providing server system to perform operations including identifying a targeted user from among one or more users based, at least in part, on information regarding previous media selections by each of the one or more users; and transmitting, to a display device, media content directed to the targeted user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3 shows an example of a table of user behavior data to implement at least one embodiment of a media content provision scheme, arranged in accordance with at least some embodiments described herein;

FIG. 4 shows an example of a table of index values to implement at least one embodiment of a media content provision scheme, arranged in accordance with at least some embodiments described herein;

DETAILED DESCRIPTION

Figure 1:
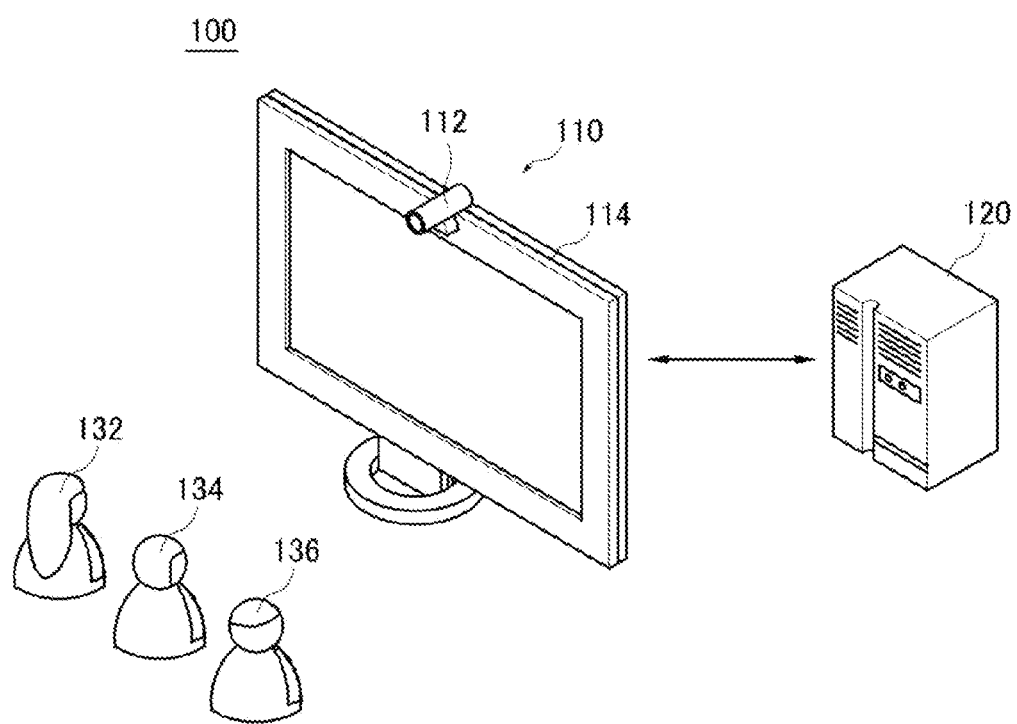
FIG. 1 shows an example of an environment in which multiple users may view media content that is transmitted from a content-providing server and is displayed by an electronic device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to provision of media content to at least one targeted user. Further, technologies are herein generally described for identifying a targeted user from among one or more users to provide the one or more users with media content directed to the targeted user.

In some examples, an electronic device (which may include a camera and/or a display) may be configured to provide media content to one or more users proximate to the electronic device. The one or more users may view the media content displayed on the display of the electronic device. The electronic device may be also configured to capture an image of the one or more users using an integrated or associated camera. In some embodiments, the electronic device may be configured to identify the one or more users from the captured image using, for example, a facial recognition technique. In some other embodiments, the electronic device may transmit the captured image to a content-providing server so that the content-providing server may identify the one or more users from the captured image.

At least one of the electronic device or the content-providing server may be configured to target and/or identify a targeted user from among the one or more users proximate to the electronic device. The targeted user may be one who is deemed to likely have a higher level of interest or have a higher level of responsiveness to an advertisement that will be transmitted from the content-providing server and displayed on the display of the electronic device. The electronic device or the content-providing server may target and/or identify the targeted user with reference to information regarding previous media selections by each of the one or more users proximate to the electronic device. The information regarding previous media selections may include an index value obtained based on each user's behavior in response to media content (which may include at least one advertisement) previously provided by the content-providing server. The behavior of each user may include at least one of watching the at least one advertisement, purchasing an item advertised by the at least one advertisement, searching for information regarding the item, or participating in a user activity associated with the item in an SNS (Social Networking Service).

By way of example, but not limitation, the electronic device may measure a time for which each user views the at least one advertisement and transmit, to the content-providing server, the measured time as data regarding the behavior of each user. Then, the content-providing server may utilize the data regarding the behavior of each user to generate the information regarding previous media selections.

The content-providing server may be configured to select and transmit, to the electronic device, media content (which may include at least one advertisement) directed to the identified targeted user. The electronic device may be configured to receive the media content and provide it to the one or more users by, for example, displaying the at least one advertisement on the display of the electronic device.

FIG. 1 shows an example of an environment in which multiple users 132, 134 and 136 may view media content that is transmitted from a content-providing server 120 and is displayed by an electronic device 110, arranged in accordance with at least some embodiments described herein.

As depicted, electronic device 110 may be communicatively coupled to content-providing server 120 over a network such as, for example, the Internet, a wireless network, a cellular network, a wide area network (WAN), a metropolitan area network (MAN), a local area network (LAN), a campus area network (CAN), a virtual private network (VPN), etc. Electronic device 110 may be any type of electronic device configured to receive, transmit, store, retrieve, and/or display media content. The media content may include advertisement data such as, for example, text data, image data, video data, audio data, or audio-video data.

By way of example, but not limitation, electronic device 110 may include a smartphone, a mobile phone, a personal digital assistant (PDA), a tablet, a hybrid of the aforementioned devices, a personal computer such as a laptop computer or a desktop computer, a television, a gaming console, an electronic billboard, and/or other devices capable of displaying media content Content-providing server 120 may be configured to receive, store, and/or provide at least one advertisement (such as, for example, an advertisement video clip, etc.) to electronic devices including electronic device 110. In some embodiments, content-providing server 120 may also be configured to store and/or provide non-advertisement content (such as, for example, a movie, a news clip, etc.) to electronic device 110, such that content-providing server 120 may provide the at least one advertisement in association with the non-advertisement content. Content-providing server 120 may be associated with a content service provider. The content service provider may include, but not be limited to, a provider focusing primarily on information and media services, content, entertainment and application services. The content service provider may utilize content-providing server 120 to provide advertisement content and/or non-advertisement content to one or more specified users or non-specified users.

As depicted in FIG. 1, electronic device 110 may include a camera 112 and a display 114. Display 114 may be configured to display various types of media content. Included in such media content may be an advertisement transmitted from content-providing server 120. Camera 112 may be configured to capture an image of users 132, 134 and 136 who may be located proximate to electronic device 110 to view display 114. Although FIG. 1 shows three users 132, 134 and 136, it is by way of an example only and is not intended to be limiting of the number of users who may watch display 114 at a given time.

In some embodiments, electronic device 110 may be configured to identify one or more of users 132, 134 and 136 from the captured image using, for example, a facial recognition application.

Additionally and/or alternatively, electronic device 110 may optionally further include a signal receiver configured to receive signals from one or more client devices that are respectively owned and/or controlled by at least some of users 132, 134 and 136. By way of example, but not limitation, one or more of users 132, 134 and 136 may own and/or control a client device (such as, for example, a mobile device) that transmits a periodic signal (such as, for example, a beacon signal, a probe request signal, etc.). Electronic device 110 may monitor and receive such signals from the respective client devices. Each received signal may include a corresponding device ID, and electronic device 110 may be configured to extract the device ID to identify and recognize a respective one of the one or more of users 132, 134 and 136, based on the device ID.

In some other embodiments, electronic device 110 may be configured to transmit, to content-providing server 120, the captured image and/or the received signals without performing the above identification process so that content-providing server 120 may perform the identification process instead of electronic device 110.

In some embodiments, at least one of electronic device 110 or content-providing server 120 may be configured to target and/or identify a targeted user from among users 132, 134 and 136 based on information regarding previous media selections by one or more of users 132, 134 and 136. By way of example, but not limitation, the targeted user may be one who is deemed likely to be the most interested in or the most responsive, from among users 132, 134 and 136, to an advertisement that will be transmitted from content-providing server 120. The information regarding previous media selections may include an index value obtained based on behavior of one or more of users 132, 134 and 136 in response to media content (which may include at least one advertisement) previously provided by content-providing server 120 to the one or more of users 132, 134 and 136. More details about the information regarding previous media selections will be described with reference to FIGS. 2-4 below. The information regarding previous media selections may be generated by and hosted on content-providing server 120. When electronic device 110 performs the identification of one or more of users 132, 134 and 136, electronic device 110 may be configured to transmit, to content-providing server 120, identification information for one or more of users 132, 134 and 136; and receive, from content-providing server 120, the information regarding previous media selections by one or more of users 132, 134 and 136 to identify the targeted user from among users 132, 134 and 136.

In some embodiments, at least one of electronic device 110 or content-providing server 120 may be configured to identify the targeted user by: identifying respective faces of users 132, 134 and 136 from the image captured by the camera of electronic device 110 using, for example, a facial recognition application; matching the respective identified faces to the corresponding information regarding previous media selections; and identifying which of the information regarding previous media selections by the respective ones of users 132, 134 and 136 has a higher index value, relative to the others. At least one user (from among users 132, 134 and 136), whose information regarding previous media selections has a higher index value relative to the others, may be identified as a targeted user.

In some other embodiments, at least one of electronic device 110 or content-providing server 120 may be configured to identify the targeted user by: identifying the respective client devices associated with users 132, 134 and 136 based on the signals received from the respective client devices; matching the respective ones of the identified client devices to the corresponding information regarding previous media selections; and identifying which of the information regarding previous media selections by the respective ones of the identified client devices has a higher index value relative to the others. At least one user of the client device (among the client devices associated with users 132, 134 and 136), whose information regarding previous media selections has a higher index value relative to the others, may be identified as a targeted user.

In some embodiments, content-providing server 120 may be configured to select media content (which may include at least one advertisement) directed to the identified targeted user. As non-limiting examples, if the identified targeted user is a housewife, the selected media content may include an advertisement for kitchen appliances; or if the identified targeted user is a teenaged boy, the selected media content may include an advertisement for computer games. Content-providing server 120 may be configured transmit, to electronic device 110, the selected media content directed to the targeted user, so that electronic device 110 may provide the selected media content to one or more of users 132, 134 and 136 by, for example, displaying the selected media content on display 114.

In some embodiments, electronic device 110 may be further configured to recognize behavior of one or more of users 132, 134 and 136 in response to the selected media content directed to the targeted user and generate data regarding the behavior of the one or more of users 132, 134 and 136. Then, electronic device 110 may transmit, to content-providing server 120, the generated data regarding the behavior of the one or more of users 132, 134 and 136. More details of the generation of the data regarding the user behavior will be described in more details with reference to FIG. 6 below.

Figure 2:
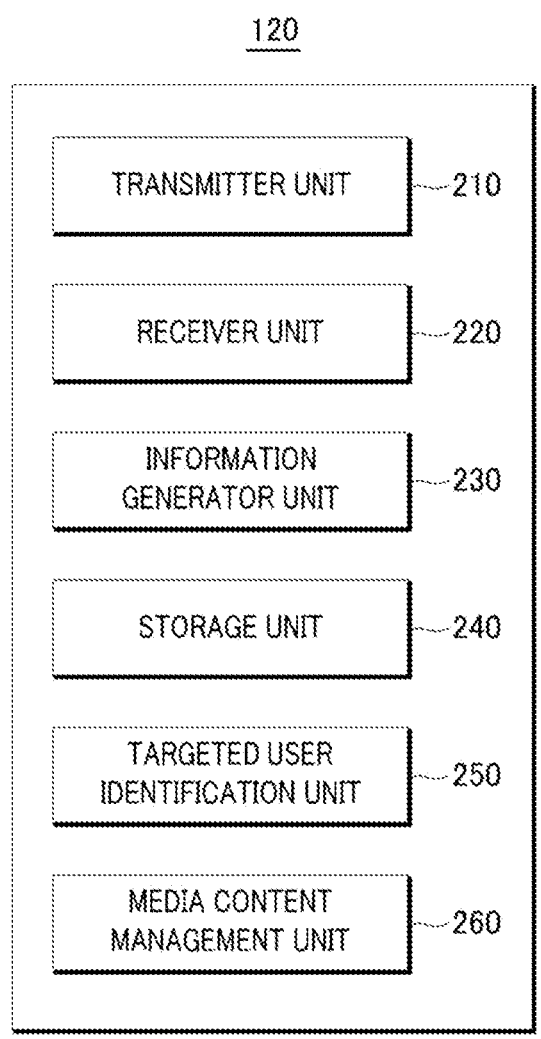
FIG. 2 shows a block diagram of an example architecture of a content-providing server configured to implement a media content provision scheme, arranged in accordance with at least some embodiments described herein.

FIG. 2 shows a block diagram of an example architecture of content-providing server 120 configured to implement a media content provision scheme, arranged in accordance with at least some embodiments described herein. Reference may be made to the embodiments depicted and described with reference to FIG. 1.

As depicted, content-providing server 120 may include a transmitter unit 210, a receiver unit 220, an information generator unit 230, a storage unit 240, a targeted user identification unit 250 and a media content management unit 260. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Transmitter unit 210 may be configured to transmit media content to one or more electronic devices having displaying capabilities (such as, for example, electronic device 110 of FIG. 1). The transmitted media content may include at least advertisement and/or non-advertisement content to be viewed by one or more users (such as, for example, one or more of users 132, 134 and 136 of FIG. 1). In some embodiments, transmitter unit 210 may be configured to transmit, to electronic device 110, information regarding previous media selections by one or more of users 132, 134 and 136.

Receiver unit 220 may be configured to receive data regarding behavior of the one or more users (such as, for example, one or more of users 132, 134 and 136 of FIG. 1) in response to the transmitted at least one advertisement. That is, the one or more of users 132, 134 and 136 may view the at least one advertisement displayed on an electronic device of the one or more electronic devices (such as, for example, electronic device 110 of FIG. 1) and may take one or more behaviors in response to the at least one advertisement. By way of example, but not limitation, the behavior of the one or more of users 132, 134 and 136 may include at least one of watching the at least one advertisement, purchasing an item advertised by the at least one advertisement, searching for information regarding the item, or participating in a user activity associated with the item in an SNS. The viewing patterns of one or more of users 132, 134 and 136, as well as corresponding searching and purchasing patterns may be captured and/or recorded by electronic device 110 and used to generate the data regarding the behavior of one or more of users 132, 134 and 136 based on such patterns. The searching and/or participating patterns may be obtained by respective client devices of the one or more of users 132, 134 and 136, and such patterns may be transmitted to one or more server devices communicatively connected with the client devices to generate the data regarding the behavior of the one or more of users 132, 134 and 136. In some embodiments, receiver unit 220 may be configured to receive the data regarding the behavior of the one or more of users 132, 134 and 136 in response to the at least one advertisement from at least one of electronic device 110, client devices of the one or more of users 132, 134 and 136, or user accounts associated with the one or more of users 132, 134 and 136 in a server system.

In some embodiments, receiver unit 220 may be configured to receive, from electronic device 110, an image of one or more of users 132, 134 and 136, which may be forwarded to targeted user identification unit 250. Further, receiver unit 220 may be configured to receive, from electronic device 110, identification information of one or more of users 132, 134 and 136.

Information generator unit 230 may be configured to generate information regarding previous media selections by the one or more of users 132, 134 and 136 based, at least in part, on the data regarding the behavior of the one or more of users 132, 134 and 136. The information regarding previous media selections may include an index value obtained based on the data regarding behavior of the one or more of users 132, 134 and 136 received by receiver unit 220.

Storage unit 240 may be configured to store the generated information regarding previous media selections by the one or more of users 132, 134 and 136. Storage unit 240 may be further configured to store the received data regarding the behavior of the one or more of users 132, 134 and 136. By way of example, storage unit 240 may store the received data regarding the behavior of the one or more of users 132, 134 and 136 in a form of a table such as, for example, in the table shown in FIG. 3, which will be described in more details below. Further, storage unit 240 may store the generated information regarding previous media selection by the one or more of users 132, 134 and 136 in a form of a table such as, for example, in the table shown in FIG. 4, which will be described more in details below.

Targeted user identification unit 250 may be configured to target and/or identify a targeted user from among the one or more users (such as, for example, the one or more of users 132, 134 and 136) based, at least in part, on the information regarding previous media selections by the one or more of users 132, 134 and 136. In some embodiments, when receiver unit 220 receives the image of the one or more of users 132, 134 and 136 from electronic device 110, targeted user identification unit 250 may be configured to identify the targeted user from among the one or more of users 132, 134 and 136 based, at least in part, on the received image and the information regarding previous media selections by the one or more of users 132, 134 and 136. By way of example, but not limitation, targeted user identification unit 250 may identify respective faces of the one or more of users 132, 134 and 136 in the received image using a facial recognition application; match the respective identified faces to the corresponding information regarding previous media selections; and identify which of the information regarding previous media selections by the respective one or more of users 132, 134 and 136 has a highest relative index value. A user whose information regarding previous media selections has the highest relative index value may be identified as the targeted user.

Media content management unit 260 may be configured to determine media content directed to the identified targeted user based on, for example, sex, age, occupation, etc. of the identified targeted user. By way of example, but not limitation, media content management unit 260 may select the media content from among multiple media content files, which may be stored in storage unit 250, in consideration of the above exemplified information of the identified target user. The determined media content may include at least one advertisement directed to the identified targeted user. As non-limiting examples, if the identified targeted user is a housewife, the determined media content may include an advertisement for kitchen appliances; or if the identified targeted user is a teenaged boy, the determined media content may include an advertisement for computer games. Media content management unit 260 may retrieve the at least one advertisement directed to the identified targeted user from storage unit 240, and transmitter unit 210 may transmit the retrieved at least one advertisement to electronic device 110.

FIG. 3 shows an example of a table of user behavior data 300 to implement at least one embodiment of a media content provision scheme, arranged in accordance with at least some embodiments described herein. Reference may be made to the embodiments depicted and described with reference to FIGS. 1 and 2.

As described with reference to FIGS. 1 and 2 above, content-providing server 120 may transmit at least one advertisement to one or more electronic devices including electronic device 110; and receive data regarding behavior of one or more users including users 132, 134 and 136, in response to the at least one advertisement, from at least one of the one or more devices, client devices of the one or more users, or user accounts associated with the one or more users in a server system. Content-providing server 120 may store the received data in a storage unit (such as, for example, storage unit 240) in a form of table of user behavior data 300.

In table 300, a column 310 for user behavior data A (e.g., time spent watching) may list the total time that each user has spent watching at least one advertisement provided by content-providing server 120; a column 320 for user behavior data B (e.g., data regarding purchased items) may list how many items each user has purchased item subsequent to viewing at least one advertisement provided by content-providing server 120; a column 330 for user behavior data C (e.g., search data regarding advertised items) may list each user's number of searches for information regarding at least one item that may have been advertised by at least one advertisement provided by content providing server 120; and a column 340 for user behavior data D (corresponding to SNS activity data) may list each user's number of participation in a user activity, in an SNS, associated with at least one item that may have been advertised by at least one advertisement provided by content providing server 120. As a non-limiting example, the user activity associated with the at least one item may include, but not limited to, a message posted on the SNS that describes about the at least one item. Further, rows 350-370 may list data regarding behavior of each of users 132, 134 and 136. Row 380 may indicate average values of each of user behavior data A-D.

By way of non-limiting example, users 132, 134 and 136 may view the at least one advertisement displayed on electronic device 110; and electronic device 110 may generate the data of each user's watching time of the at least one advertisement. At least one of users 132, 134 and 136 may use electronic device 110 to purchase at least one item based on the displayed advertisement; and electronic device 110 may generate user behavior data of the purchased item data. As another non-limiting example, at least one of users 132, 134 and 136 may conduct a search using electronic device 110 that may display the at least one advertisement, or using a client device of each user (such as, for example, a mobile device that may be communicatively connected to a search server).

In some embodiments, content-providing server 120 may generate information regarding previous media selections by one or more users including users 132, 134 and 136 based on the data from table of user behavior data 300. The information regarding previous media selection will be described in more details with reference to FIG. 4 below.

FIG. 4 shows an example of a table of index values 400 to implement at least one embodiment of a media content provision scheme, arranged in accordance with at least some embodiments described herein. Reference may be made to the embodiments depicted and described with reference to FIGS. 1-3.

In some embodiments, columns 410-440 may list index values obtained based on the user behavior data of columns 310-340 of table 300, respectively, and rows 460-480 may list index values for each of users 132, 134 and 136. By way of non-limiting example, each index value may be obtained by dividing each user behavior data by a corresponding average value from column 380. For example, user 132's index value for user behavior data A of 1.875 (which is from an intersecting point of row 460 and column 410 in FIG. 4) may be obtained by dividing user 132's total watching time of 150 (which is from an intersecting point of row 350 and column 310 in FIG. 3) by the average watching time of 80 (which is from an intersecting point of row 380 and column 310 in FIG. 3).

In some embodiments, content-providing server 120 and/or information generator unit 230 may generate table of index values 400 with reference to table of user behavior data 300. Table of index values 400 may be stored in storage unit 240. By way of example, but not limitation, table of index values 400 may be updated periodically, when table of user behavior data 300 is updated, or when initiated by an operator of content-providing server 120. In some embodiments, data in table of index values 400 may be utilized to identify a targeted user from among multiple users who are viewing a same display device. The targeted user may be one who will be the most interested in or the most responsive to an advertisement that will be provided by content-providing server 120 and displayed on the display device.

Figure 5:
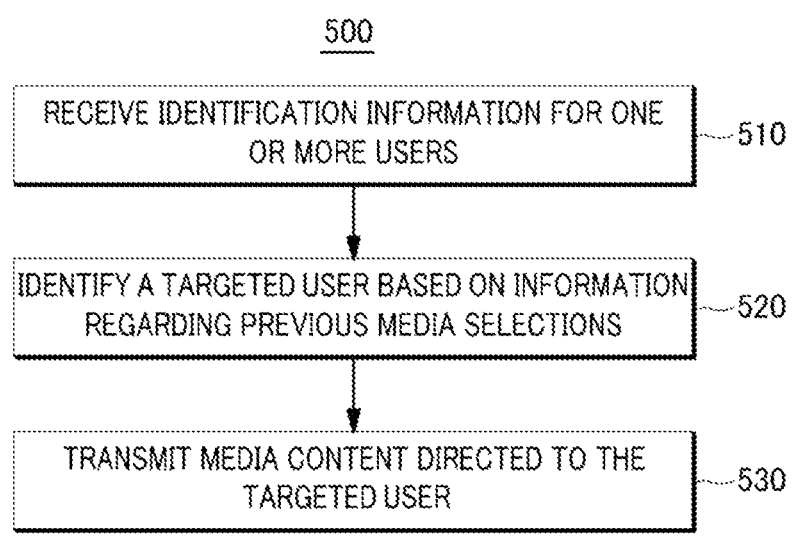
FIG. 5 shows an example flow diagram of a process to implement at least one embodiment of a media content provision scheme, arranged in accordance with at least some embodiments described herein.

FIG. 5 shows an example flow diagram of a process 500 to implement at least one embodiment of a media content provision scheme, arranged in accordance with at least some embodiments described herein.

Process 500 may be implemented in a content-providing server such as content providing server 120 including at least some of transmitter unit 210, receiver unit 220, information generator unit 230, storage unit 240, targeted user identification unit 250 or media content management unit 260. Process 500 may also be implemented by computer programs or program modules that may be adapted to provide a media content provision scheme and hosted by content-providing server 120. Thus, reference may be made to the embodiments depicted and described with reference to FIGS. 1-4. Process 500 may include one or more operations, actions, or functions as illustrated by one or more blocks 510, 520 and/or 530. Although illustrated as discrete blocks, various blocks may be divided into additional blocks, combined into fewer blocks, or eliminated, depending on the desired implementation. Processing may begin at block 510.

At block 510 (Receive Identification Information for One or More Users), content-providing server 120 and/or receiver unit 220 may receive, from an electronic device (such as, for example, electronic device 110) identification information of at least one of users 132, 134 and 136 who are located proximate to electronic device 110. By way of example, but not limitation, electronic device 110 may obtain the identification information by using a facial recognition application from a captured image of one or more of users 132, 134 and 136 or by recognizing signals from client devices of one or more of users 132, 134 and 136. Processing may continue from block 510 to block 520.

At block 520 (Identify a Targeted User Based on Information Regarding Previous Media Selections), content-providing server 120 and/or targeted user identification unit 250 may identify a targeted user based on information regarding previous media selections by one or more of users 132, 134 and 136. In some embodiments, the information regarding previous media selections may have been generated by information generator unit 230 and stored in storage unit 240 in a form of a table such as, for example, table of index values 400. By way of example, but not limitation, targeted user identification unit 250 may identify which of the information regarding previous media selections by the respective ones of one or more of users 132, 134 and 136 has a highest relative index value. The user (from among users 132, 134 and 136), whose information regarding previous media selections has the highest relative index value, may be identified as the targeted user.

At block 530 (Transmit Media Content Directed to the Targeted User), content-providing server 120 and/or media content management unit 260 may determine media content (including at least one advertisement) directed to the targeted user based on, for example, sex, age, occupation, etc. of the identified targeted user. Then, content-providing server 120 and/or transmitter unit 210 may transmit the determined media content to electronic device 110, which will provide the determined media content to users 132, 134 and 136.

As such, content-providing server 120 may be able to provide users 132, 134 and 136 with the at least one advertisement directed to the targeted user among users 132, 134 and 136, and thus, it may be possible to provide audience-centric content and increase the advertisement effectiveness.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
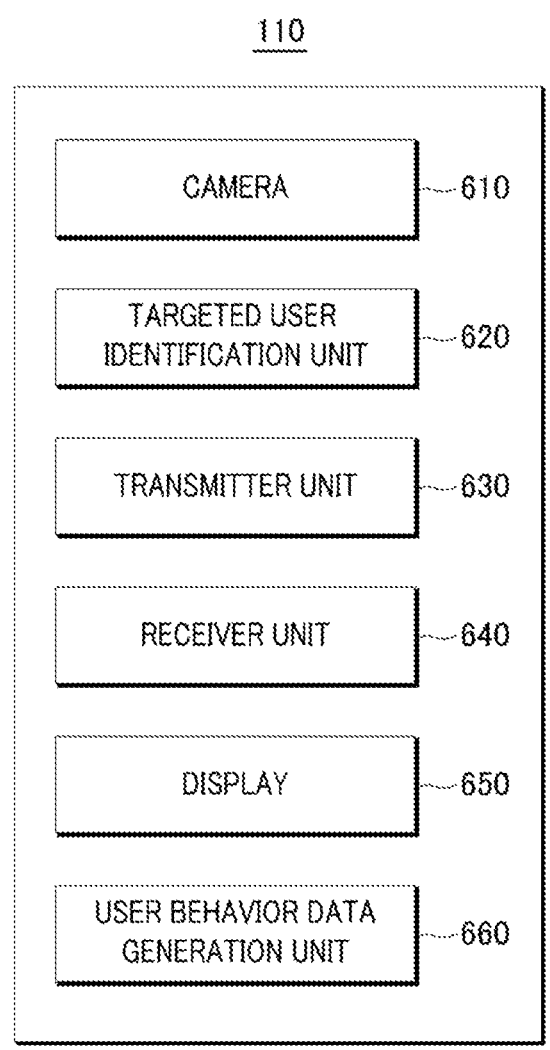
FIG. 6 shows a block diagram of an example architecture of an electronic device configured to implement at least one embodiment of a media content provision scheme, arranged in accordance with at least some embodiments described herein.

FIG. 6 shows a block diagram of an example architecture of electronic device 110 configured to implement at least one embodiment of a media content provision scheme, arranged in accordance with at least some embodiments described herein. Reference may be made to the embodiments depicted and described with reference to FIGS. 1-5.

As depicted, electronic device 110 may include a camera 610, a targeted user identification unit 620, a transmitter unit 630, a receiver unit 640, a display 650 and a user behavior data generation unit 660. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Camera 610 may be configured to capture an image of users 132, 134 and 136 who are located proximate to electronic device 110. Camera 610 may be an internal camera or one which is operatively connected to electronic device 110. The captured image may be transmitted to targeted user identification unit 620.

Targeted user identification unit 620 may be configured to identify a targeted user from among users 132, 134 and 136 based on information regarding previous media selections by one or more of users 132, 134 and 136. In some embodiments, the information regarding previous media selections may be generated and provided by a content-providing server such as, for example, content-providing server 120. The information regarding previous media selections may include an index value obtained based on each user's behavior in response to media content previously provided by content-providing server 120, and may be retrieved from a table-type database such as, for example, table of index values 400 of FIG. 4.

Transmitter unit 630 may be configured to transmit, to content-providing server 120, identification information for one or more of users 132, 134 and 136, and then receiver unit 640 may be configured to receive, from content-providing server 120, the information regarding previous media selections by one or more of users 132, 134 and 136. In some embodiments, transmitter unit 630 may be configured to transmit, to content-providing server 120, the image captured by camera 610, and then receiver unit 640 may be configured to receive, from content-providing server 120, the information regarding previous media selections by one or more of users 132, 134 and 136. The received information may be forwarded to targeted user identification unit 620 to identify the targeted user, as described above.

In some embodiments, transmitter unit 630 may be configured to transmit, to content-providing server 120, identification information for the targeted user, and then receiver unit 640 may be configured to receive, from content-providing server 120, media content (which may include at least one advertisement) directed to the targeted user. Display 650 may be configured to display media content including the at least one advertisement directed to the targeted user.

User behavior data generation unit 660 may be configured to generate data regarding behavior of one or more of users 132, 134 and 136. By way of example, but not limitation, user behavior data generation unit 660 may identify recognize user's total watching time of the at least one advertisement based on image data received from camera 610 and generate data thereof. The generated data may be transmitted to content-providing server 120 by transmitter unit 630.

Figure 7:
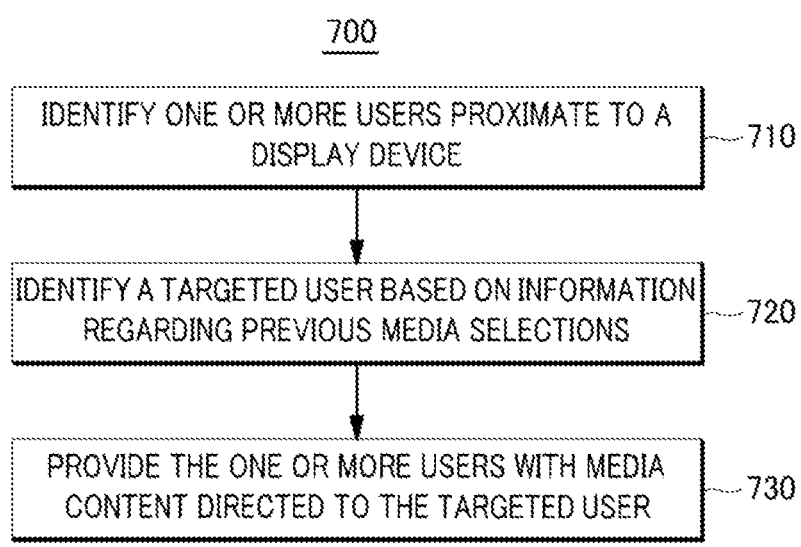
FIG. 7 shows another example flow diagram of a process to implement at least one embodiment of a media content provision scheme, arranged in accordance with at least some embodiments described herein.

FIG. 7 shows another example flow diagram of a process 700 to implement at least one embodiment of a media content provision scheme, arranged in accordance with at least some embodiments described herein.

Process 700 may be implemented in an electronic device such as content electronic device 110 including at least some of a camera 610, a targeted user identification unit 620, a transmitter unit 630, a receiver unit 640, a display 650 or a user behavior data generation unit 660. Process 700 may also be implemented by computer programs or program modules that may be adapted to provide a media content provision scheme and hosted by electronic device 110. Thus, reference may be made to the embodiments depicted and described with reference to FIGS. 1-6. Process 700 may include one or more operations, actions, or functions as illustrated by one or more blocks 710, 720 and/or 730. Although illustrated as discrete blocks, various blocks may be divided into additional blocks, combined into fewer blocks, or eliminated, depending on the desired implementation. Processing may begin at block 710.

At block 710 (Identify One or More Users Proximate to a Display Device), electronic device 110 may identify each of one or more users (such as, for example, one or more of users 132, 134 and 136) proximate to electronic device 110. In some embodiments, electronic device 110 may identify one or more of users 132, 134 and 136 from an image captured by a camera (such as, for example, camera 610) using, for example, a facial recognition application. In some other embodiments, electronic device 110 may receive signals from one or more client devices that one or more of users 132, 134 and 136 have so that electronic device 110 may recognize one or more of users 132, 134 and 136 based, at least in part, on the received signals. Processing may continue from block 710 to block 720.

At block 720 (Identify a Targeted User Based on Information Regarding Previous Media Selections), electronic device 110 and/or targeted user identification unit 620 may identify a targeted user from among users 132, 134 and 136 based on information regarding previous media selections by one or more of users 132, 134 and 136. In some embodiments, the information regarding previous media selections may be generated and provided by a content-providing server such as, for example, content-providing server 120. The information regarding previous media selections may include an index value obtained based on user's behavior in response to media content previously provided by content-providing server 120, and may be retrieved from a table-type database such as, for example, table of index values 400 of FIG. 4. Processing may continue from block 720 to block 730.

At block 730 (Provide the One or More Users with Media Content Directed to the Targeted User), electronic device 110 and/or display 650 may display media content including at least one advertisement directed to the identified targeted user. In some embodiments, electronic device 110 and/or transmitter unit 630 may transmit, to content-providing server 120, identification information for the targeted user, and then electronic device 110 and/or receiver unit 640 may receive, from content-providing server 120, the media content directed to the targeted user.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
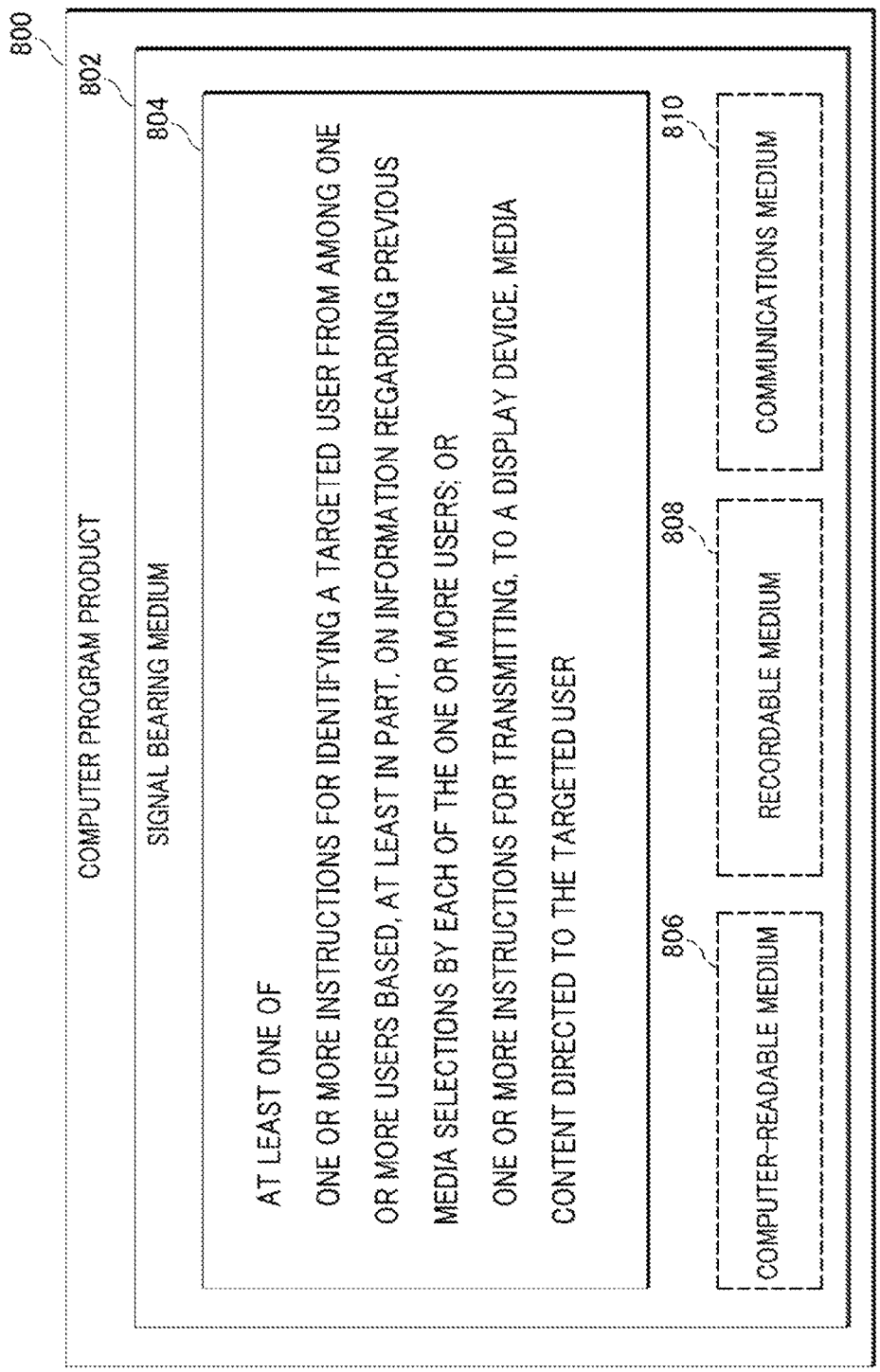
FIG. 8 illustrates an example computer program product that may be utilized to implement at least one embodiment of a media content provision scheme, arranged in accordance with at least some embodiments described herein.

FIG. 8 illustrates an example computer program product that may be utilized to implement at least one embodiment of a media content provision scheme, arranged in accordance with at least some embodiments described herein.

As depicted, program product 800 may include a signal bearing medium 802. Signal bearing medium 802 may include one or more instructions 804 that, when executed by, for example, a processor of content-providing server 120 may provide the functionality described above with respect to FIGS. 1-7. By way of example, instructions 804 may include: one or more instructions for identifying a targeted user from among one or more users based, at least in part, on information regarding previous media selections by each of the one or more users; or one or more instructions for transmitting, to a display device, media content directed to the targeted user.

In some implementations, signal bearing medium 802 may encompass a computer-readable medium 806, such as, but not limited to, a hard disk drive, a CD, a DVD, a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of content-providing server 120 by an RF signal bearing medium 802, where the signal bearing medium 802 is conveyed by a wireless communications medium 810 (e.g., a wireless communications medium conforming with the IEEE 802.11 standard).

Figure 9:
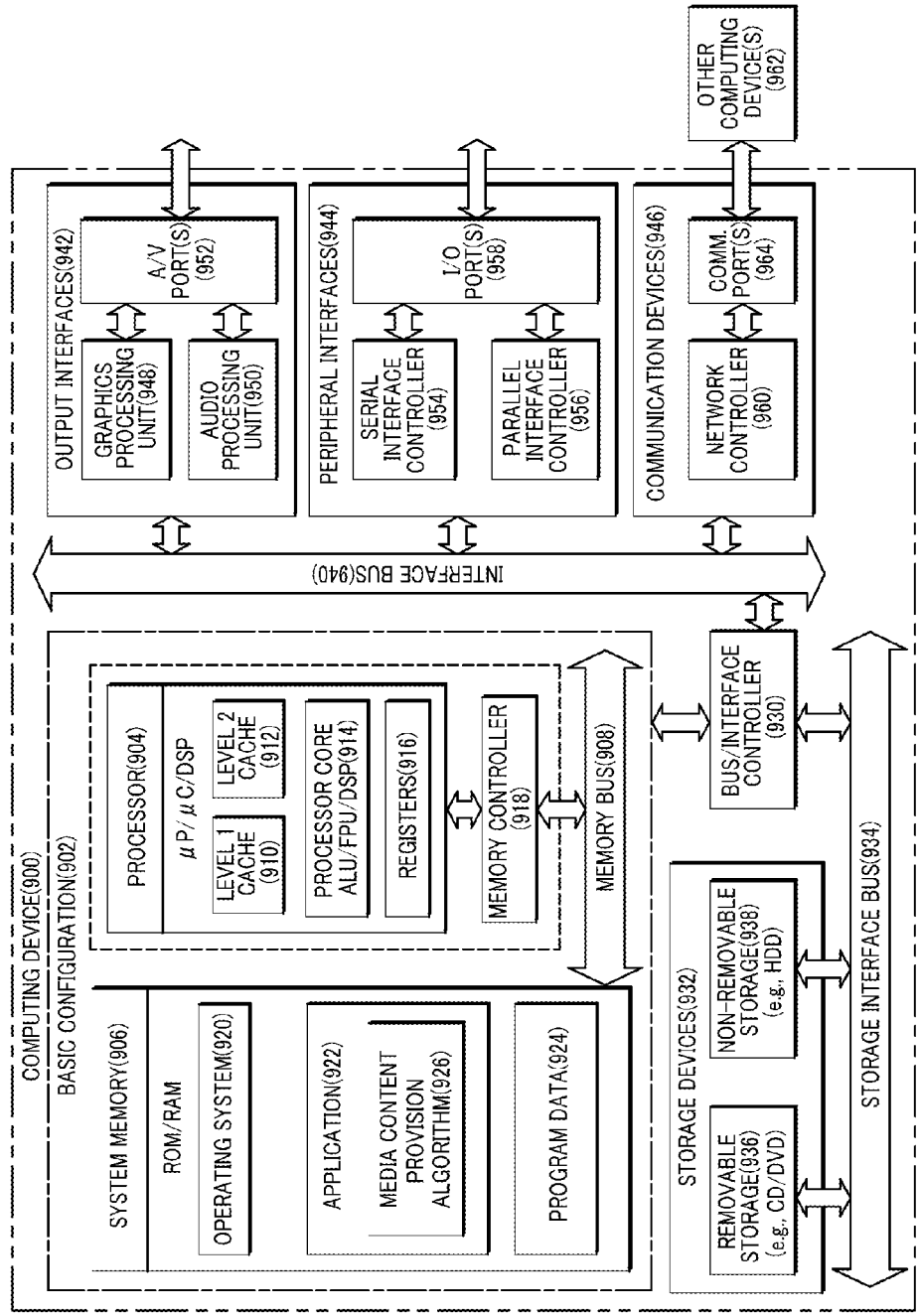
FIG. 9 is a block diagram illustrating an example computing device that may be utilized to implement at least one embodiment of a media content provision scheme, arranged in accordance with at least some embodiments described herein.

FIG. 9 is a block diagram illustrating an example computing device that may be utilized to implement at least one embodiment of a media content provision scheme, arranged in accordance with at least some embodiments described herein.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include a media content provision algorithm 926 that may be arranged to perform the functions as described herein including the actions described with respect to electronic device 110 architecture as shown in FIG. 6 and/or content-providing server 120 architecture as shown in FIG. 2 or including the actions described with respect to the flow chart shown in FIGS. 5 and 7. Program data 924 may include any data that may be useful for providing the media content provision scheme as is described herein. In some examples, application 922 may be arranged to operate with program data 924 on an operating system 920 such that the media content provision scheme as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed by a content-provider server that includes at least a hardware processor to provide audience-centric content, the method comprising:
   receiving, by a receiver of the content-provider server, first information usable by the content-provider server to identify each user of a plurality of users who are present within a specific distance from a location of a same single electronic device at a given time, wherein the receiving the first information comprises receiving an information from each client device of a plurality of client devices, and wherein each client device of the plurality of client devices is associated with a particular user of the plurality of users;
   using, by the hardware processor of the content-provider server, the first information to identify each user of the plurality of users;
   identifying, by the hardware processor of the content provider server, a targeted user from among the identified plurality of users who are present within the specific distance from the location of the same single electronic device at the given time, wherein the identifying the targeted user is based, at least in part, on corresponding second information regarding previous media selections by each user of the plurality of users; and
   providing, by a transmitter of the content-provider server, the plurality of users with media content directed to the targeted user at the same single electronic device,
   wherein the second information regarding previous media selections comprises a plurality of index values, wherein each index value is associated with a corresponding user of the plurality of users and with a behavior of the corresponding user in response to media content previously provided by the content-provider server to the corresponding user, wherein the plurality of index values is updated in response to detection of a change in the behavior of the corresponding user of the plurality of users, wherein the identifying the targeted user from among the plurality of users comprises identifying the targeted user as a user associated with a highest index value of the plurality of index values, and wherein the providing the media content is performed based on the identification of the targeted user associated with the highest index value at the given time, thereby enabling the content-provider server to provide the media content to one or more targeted users, in the plurality of users, who will have a higher level of interest in the media content or who will have a higher level of responsiveness to the media content, relative to levels of interest or responsiveness of one or more other users in the plurality of users at the given time, so as to increase effectiveness of the media content being provided to the plurality of users at the given time.

2. The method of claim 1, wherein the plurality of users include one or more viewers of a television.

3. The method of claim 1, wherein the providing the media content includes providing at least one advertisement.

4. The method of claim 1, wherein:

the using the first information to identify each user of the plurality of users comprises obtaining, from one or more signals received by the receiver from the plurality of client devices associated with the plurality of users, a device ID for each of the plurality of client devices, and the identifying the targeted user comprises using the device ID to match recognized ones of the plurality of client devices to the corresponding second information regarding previous media selections.

5. The method of claim 1, further comprising:

receiving, by the receiver of the content-provider server, data regarding behavior of each user of the plurality of users in response to the media content directed to the targeted user.

6. The method of claim 5, wherein the behavior of each user of the plurality of users in response to the media content includes at least one of watching at least one advertisement, purchasing an item advertised by the at least one advertisement, searching for information regarding the item, or participating in a user activity associated with the item in a social networking service (SNS).

7. A non-transitory computer-readable storage medium having stored thereon computer-executable instructions that, in response to execution, cause a content-provider server to perform or control performance of operations that comprise:

obtain first information usable by the content-provider server to identify each user of a plurality of users who are present within a specific distance from a location of a same single electronic display device at a given time, wherein the operations to obtain the first information include at least one operation to obtain an image of the plurality of users who are present within the specific distance from the location of the same single electronic device;

use the first information to identify each user of the plurality of users;

identify a targeted user from among the identified plurality of users who are present within the specific distance from the location of the same single electronic display device at the given time, wherein the identification of the targeted user is based, at least in part, on corresponding second information regarding previous media selections by each user of the plurality of users; and transmit, to the same single electronic display device, media content directed to the targeted user at the same single electronic display device, wherein the second information regarding previous media selections comprises a plurality of index values, wherein each index value is associated with a corresponding user of the plurality of users and with a behavior of the corresponding user in response to media content previously provided by the content-provider server to the corresponding user, wherein the plurality of index values is updated in response to detection of a change in the behavior of the corresponding user of the plurality of users, wherein the identification of the targeted user from among the plurality of users comprises identification of the targeted user as a user associated with a highest index value of the plurality of index values, and wherein the media content is transmitted based on the identification of the targeted user associated with the highest index value at the given time, thereby enabling the content-provider server to provide the media content to one or more targeted users, in the plurality of users, who will have a higher level of interest in the media content or who will have a higher level of responsiveness to the media content, relative to levels of interest or responsiveness of one or more other users in the plurality of users at the given time, so as to increase effectiveness of the media content being provided to the plurality of users at the given time.

8. The non-transitory computer-readable storage medium of claim 7, wherein:

the operations to use the first information include at least one operation to identify respective faces of the plurality of users in the received image by use of a facial recognition technique, and the operations to identify the targeted user include at least one operation to match the respective identified faces to the corresponding second information regarding previous media selections.

9. The non-transitory computer-readable storage medium of claim 7, wherein the media content includes at least one advertisement.

10. The non-transitory computer-readable storage medium of claim 7, wherein the operations further comprise:

obtain data regarding behavior of each user of the plurality of users in response to the media content directed to the targeted user.

* * * * *

UNITED STATES PATENT AND TRADEMARK OFFICE
CERTIFICATE OF CORRECTION

PATENT NO. : 9,852,445 B2  
APPLICATION NO. : 14/295936  
DATED : December 26, 2017  
INVENTOR(S) : Kim et al.

It is certified that error appears in the above-identified patent and that said Letters Patent is hereby corrected as shown below:

In the Drawings

In Fig. 9, Sheet 9 of 9, for Tag "(942)", Line 1, delete "OUTPUT INTERFACES(942)" and insert -- OUTPUT DEVICES(942) --, therefor.

In the Specification

In Column 4, Line 7, delete "media content" and insert -- media content. --, therefor.

In Column 6, Line 30, delete "having displaying" and insert -- having display --, therefor.

In Column 7, Line 66, delete "storage unit 250," and insert -- storage unit 240, --, therefor.

In Column 8, Line 42, delete "content providing" and insert -- content-providing --, therefor.

In Column 8, Line 47, delete "content providing" and insert -- content-providing --, therefor.

In Column 9, Line 19, delete "column 380." and insert -- row 380. --, therefor.

In Column 9, Line 46, delete "content providing" and insert -- content-providing --, therefor.

In Column 12, Line 54, delete "program product 800" and insert -- computer program product 800 --, therefor.

In Column 13, Line 1, delete "a hard disk drive, a CD, a DVD," and insert -- a hard disk drive (HDD), a compact disk (CD), a digital versatile disk (DVD), --, therefor.

In Column 13, Line 9, delete "communications link," and insert -- communication link, --, therefor.

Signed and Sealed this  
First Day of May, 2018

Andrei Iancu  
*Director of the United States Patent and Trademark Office*

CERTIFICATE OF CORRECTION (continued)
U.S. Pat. No. 9,852,445 B2

In Column 13, Line 10, delete "program product 800" and insert -- computer program product 800 --, therefor.

In Column 13, Lines 36-37, delete "implementations memory" and insert -- implementations, memory --, therefor.

In Column 15, Line 23, delete "recitation no" and insert -- recitation, no --, therefor.

In Column 15, Line 45, delete "general such" and insert -- general, such --, therefor.

In Column 15, Line 52, delete "general such" and insert -- general, such --, therefor.

In the Claims

In Column 17, Line 21, in Claim 2, delete "include one" and insert -- includes one --, therefor.